United States Patent
Lemmers, Jr. et al.

(10) Patent No.: US 11,098,654 B2
(45) Date of Patent: *Aug. 24, 2021

(54) HYDRAULIC UNIT GEAR SHROUDS

(71) Applicant: Hamilton Sundstrand Corporation, Charlotte, NC (US)

(72) Inventors: Glenn C. Lemmers, Jr., Loves Park, IL (US); Derek R. Hochstetler, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 93 days.

This patent is subject to a terminal disclaimer.

(21) Appl. No.: 16/355,267

(22) Filed: Mar. 15, 2019

(65) Prior Publication Data

US 2020/0291864 A1 Sep. 17, 2020

(51) Int. Cl.
*F02C 7/36* (2006.01)
*F02C 7/32* (2006.01)

(52) U.S. Cl.
CPC .................. *F02C 7/32* (2013.01); *F02C 7/36* (2013.01); *F05D 2260/40311* (2013.01)

(58) Field of Classification Search
CPC ..... F02C 7/32; F02C 7/36; F05D 2260/40311
See application file for complete search history.

(56) References Cited

U.S. PATENT DOCUMENTS

| | | | | |
|---|---|---|---|---|
| 3,788,426 A | * | 1/1974 | Hull, Jr. | F16H 57/0415 184/109 |
| 4,352,301 A | * | 10/1982 | Fleury | F16H 57/0434 184/6.12 |
| 9,879,773 B2 | | 1/2018 | Slayter et al. | |
| 9,989,143 B2 | | 6/2018 | Fomison | |
| 2012/0238396 A1 | * | 9/2012 | Weber | F16H 57/0423 475/230 |
| 2014/0260790 A1 | | 9/2014 | Passino et al. | |
| 2016/0245162 A1 | * | 8/2016 | Lamarre | F01C 11/008 |
| 2016/0245163 A1 | * | 8/2016 | Lamarre | F02B 41/10 |
| 2016/0290396 A1 | | 10/2016 | Lemmers, Jr. et al. | |
| 2017/0146112 A1 | | 5/2017 | Anglin et al. | |
| 2019/0048994 A1 | * | 2/2019 | Hasting | F16H 57/0479 |
| 2019/0078975 A1 | * | 3/2019 | Sibbach | F16H 57/01 |
| 2019/0186364 A1 | * | 6/2019 | Greenfield | F23R 3/343 |
| 2019/0207482 A1 | * | 7/2019 | Hochstetler | H02K 5/20 |
| 2020/0032893 A1 | * | 1/2020 | Simon | F02C 7/36 |

FOREIGN PATENT DOCUMENTS

JP    2015089748 A    5/2015

OTHER PUBLICATIONS

Extended European Search Report dated Mar. 11, 2020, issued during the prosecution of European Patent Application No. EP 19213602.6.

\* cited by examiner

*Primary Examiner* — Zakaria Elahmadi
(74) *Attorney, Agent, or Firm* — Locke Lord LLP; Scott D. Wofsy; Joshua L. Jones

(57) ABSTRACT

A gear shroud arrangement includes a plate defining an aperture therethrough. A riser tube has a first end and an opposed second end. The first end of the riser tube is connected to the plate and is aligned with the aperture. A mounting flange extends from the second end of the riser tube. A shroud member extends from the plate in a direction opposite the riser tube.

12 Claims, 5 Drawing Sheets

HYDRAULIC UNIT GEAR SHROUDS

BACKGROUND OF THE INVENTION

1. Field of the Invention

The present disclosure relates to gear shrouds, and more particularly to gear shrouds for gears Integrated Drive Generators (IDGs).

2. Description of Related Art

Generators are connected to gas turbine engines so that aircraft can generate on board electricity. In order to produce useful power, generators need to be driven at a substantially constant speed. To drive a generator at a constant speed using a gas turbine engine that runs at very different speeds at different stages in a flight, a constant speed drive (CSD) can be connected between the gas turbine engine and the generator. A CSD is a type of transmission that reduces the range of speed at its input to a much narrower range of speed at its output to provide a nearly constant output speed over a range of input speeds. A CSD and generator can be integrated together into a single unit called an IDG.

The conventional techniques have been considered satisfactory for their intended purpose. However, there is an ever present need for improved CSDs and IDGs. This disclosure provides a solution for this need.

SUMMARY OF THE INVENTION

A gear shroud arrangement includes a plate defining an aperture therethrough. A riser tube having a first end and an opposed second end is included, wherein the first end of the riser tube is connected to the plate and is aligned with the aperture. A mounting flange extends from the second end of the riser tube. A shroud member extends from the plate in a direction opposite the riser tube.

The shroud member can include a first shroud segment circumferentially crossing a 12 o'clock position on the plate as viewed looking toward the mounting flange. A second shroud segment can start circumferentially between the 12 o'clock position and a 9 o'clock position relative to the 12 o'clock position, and can extend counter-clockwise to a position circumferentially between the 9 o'clock position and a 6 o'clock position relative to the 12 o'clock position. The second shroud segment can be convex relative to the riser tube. The plate can define a concavity between the 12 o'clock position and the 9 o'clock position for accommodating a differential gear meshing with hydraulics transmission gear shrouded by the shroud member.

The plate can define a registration feature for registering the plate with an IDG, wherein the registration feature includes a radiused section extending from a 6 o'clock position through a 3 o'clock position, and past a 1 o'clock position relative to the 12 o'clock position. The registration feature can include a flat land extending tangent to the radiused section from the 6 o'clock position, terminating in an end that is perpendicular to the flat land. An IDG housing can be included, wherein the registration feature is engaged to an outer housing wall of the IDG housing.

The mounting flange can define a plurality of fastener apertures therethrough. A hydraulic transmission unit can be mounted to the mounting flange by fasteners engaged in the fastener apertures. An opposed gear shroud for a second hydraulic transmission unit can extend parallel to the first hydraulic transmission unit, wherein the opposed gear shroud includes a concavity in the plate thereof that engages the plate of the first hydraulic transmission unit.

The riser tube can define an aperture therethrough extending in a circumferential portion of the riser tube from a position between a 1 o'clock position and the 12 o'clock position, and a position between 10 o'clock and 9 o'clock relative to the 12 o'clock position. A differential shroud can extends within the aperture.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1A:
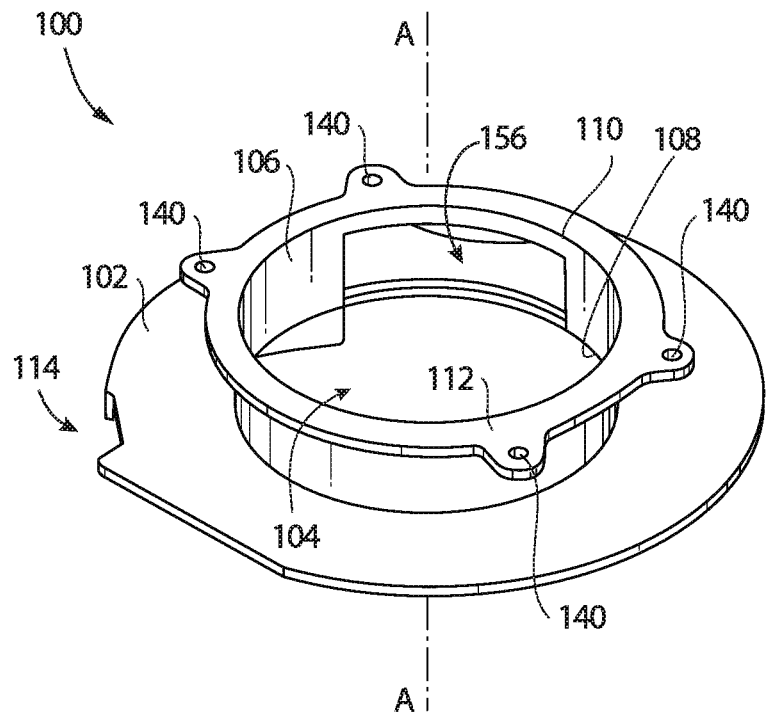
FIG. 1A is a perspective view of an exemplary embodiment of a gear shroud constructed in accordance with the present disclosure, showing the plate with the riser tube extending therefrom.

Reference will now be made to the drawings wherein like reference numerals identify similar structural features or aspects of the subject disclosure. For purposes of explanation and illustration, and not limitation, a partial view of an exemplary embodiment of a gear shroud arrangement in accordance with the disclosure is shown in FIG. 1A and is designated generally by reference character 100. Other embodiments of gear shrouds in accordance with the disclosure, or aspects thereof, are provided in FIGS. 1B and 2-6, as will be described. The systems and methods described herein can be used to shroud gears in IDGs to reduce the amount of oil churning, which improves IDG efficiency and scavenge pump performance, thus improving the IDG oil servicing range.

Figure 2:
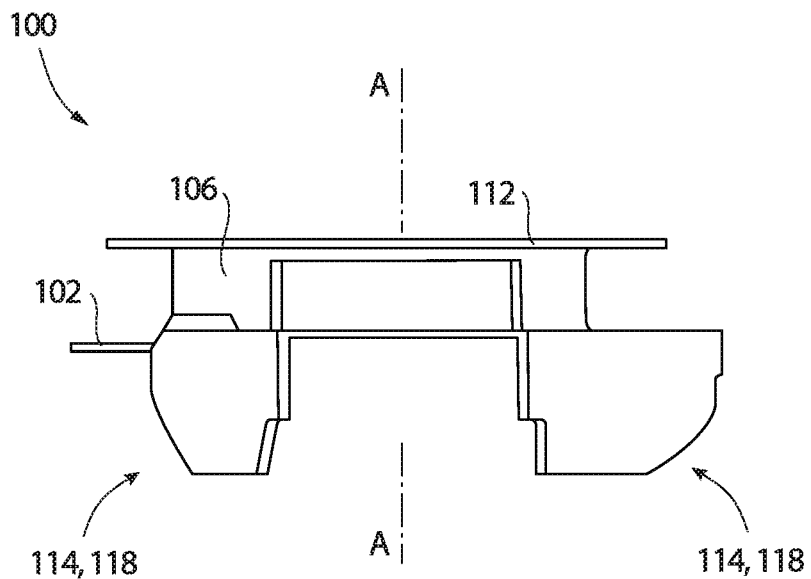
FIG. 2 is a side elevation view of the gear shroud of FIG. 1, showing the shroud member

The gear shroud arrangement 100 includes a plate 102 defining an aperture 104 therethrough. A riser tube 106 having a first end 108 and an opposed second end 110 is included, wherein the first end 108 of the riser tube 106 is connected to the plate 102 and is aligned with the aperture 104 along the axis A. A mounting flange 112 extends from the second end 110 of the riser tube 106. As shown in FIG. 2, a shroud member 114 extends from the plate 102 in a direction opposite the riser tube 106. The shroud member 114 includes a first shroud segment 116 and a second shroud segment 118.

Figure 1B:
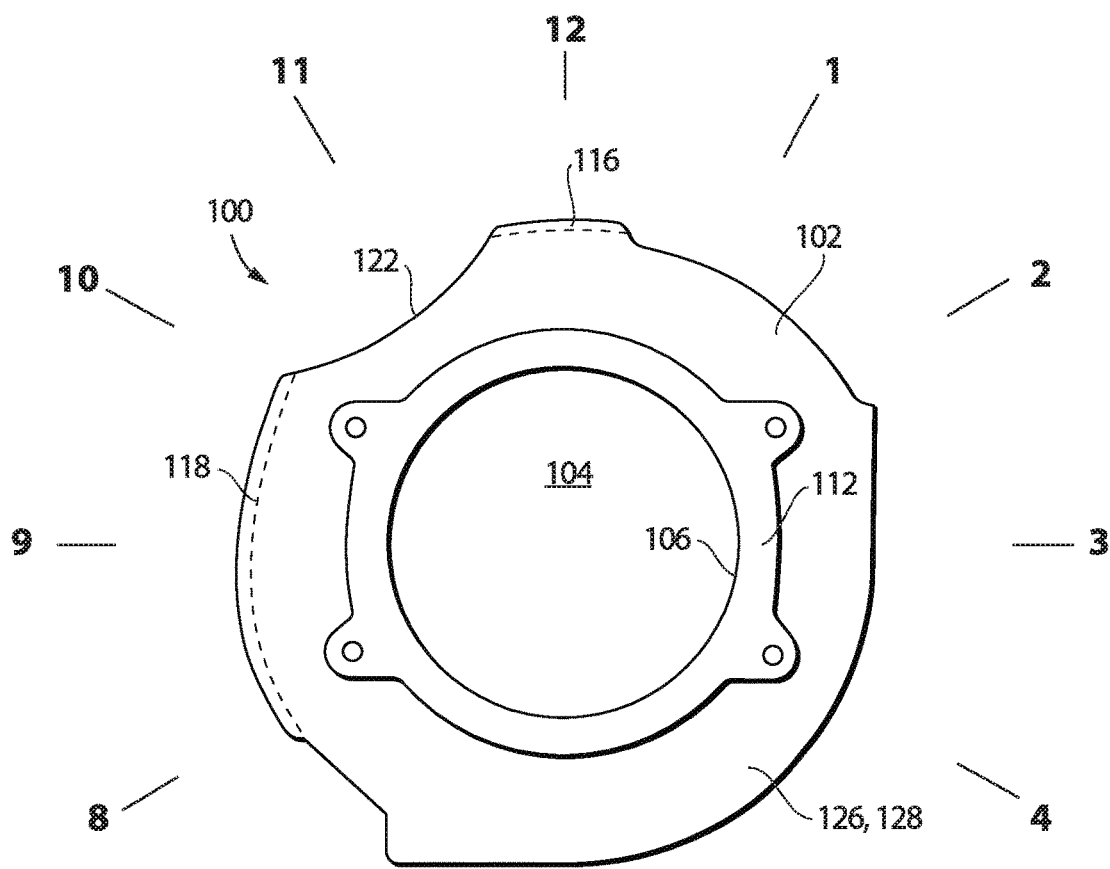
FIG. 1B is a plan view of the gear shroud of FIG. 1, showing the registration feature.

With reference now to FIG. 1B, the first shroud member 114 circumferentially crosses a 12 o'clock position on the plate 102 as viewed looking toward the mounting flange 112. The second shroud segment 118 starts circumferentially between the 12 o'clock position and a 9 o'clock position relative to the 12 o'clock position, and extends counter-clockwise to a position circumferentially between the 9 o'clock position and a 6 o'clock position relative to the 12 o'clock position. The first and second shroud segments 116, 118 are convex relative to the riser tube 106. The plate 102 defines a concavity 122 between the 12 o'clock position and the 9 o'clock position for accommodating a differential gear 152 meshing with a hydraulics transmission gear 154 shrouded by the shroud member 114, as shown in FIG. 4.

Figure 5:
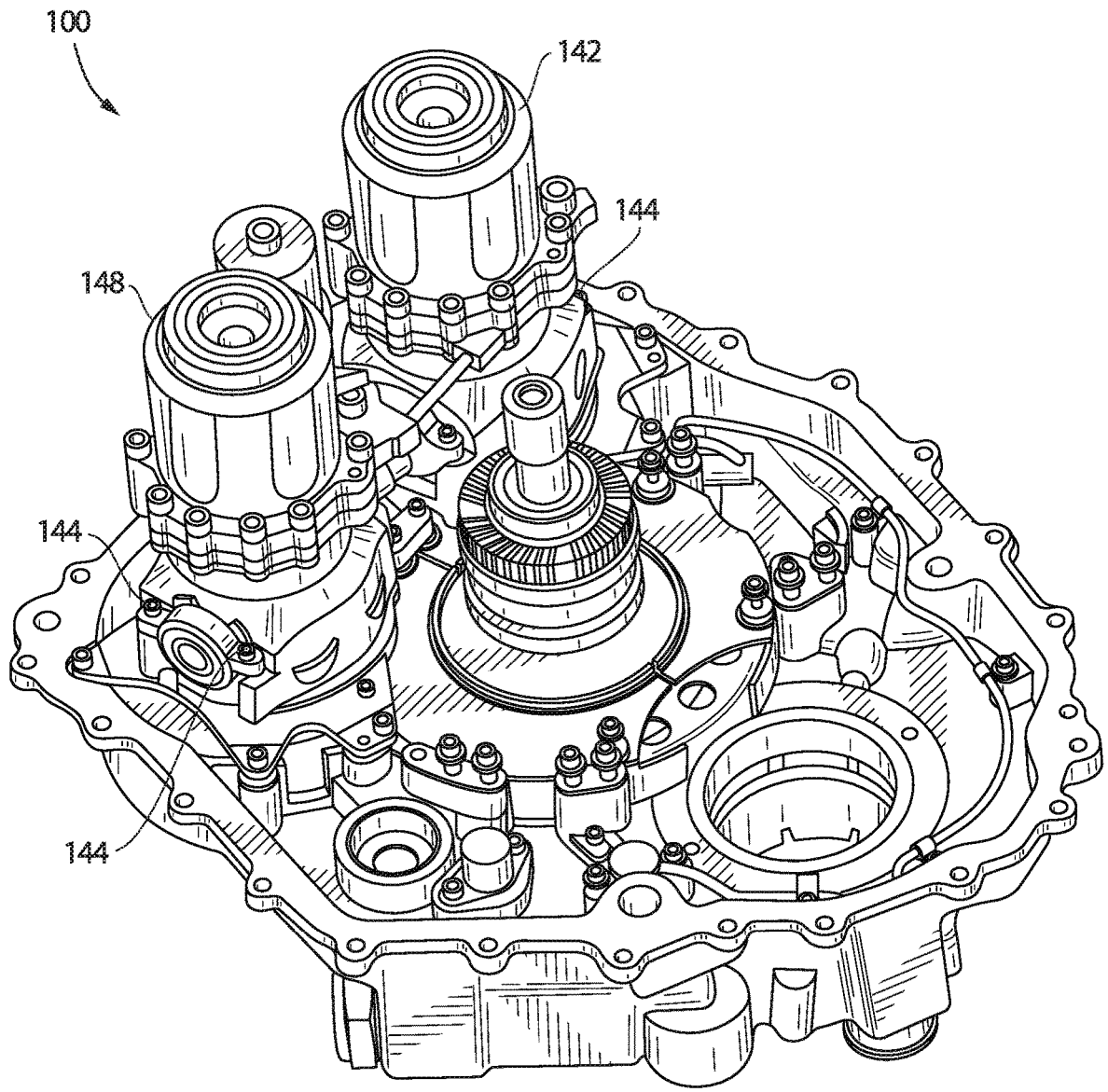
FIG. 5 is a perspective view of the gear shroud arrangement of FIG. 4, showing two hydraulic transmission units and a differential unit engaged in the IDG housing.

With continued reference to FIG. 1B, the plate 102 defines a registration feature 126 for registering the plate 102 with an IDG housing 136, identified in FIG. 5. The registration feature 126 includes a radiused section 128 extending from a 6 o'clock position through a 3 o'clock position, and past a 1 o'clock position relative to the 12 o'clock position. The registration feature 126 includes a flat land 134 extends tangent to the radiused section 128 from the 6 o'clock position, terminating in an end 136 that is perpendicular to the flat land 134.

Figure 4:
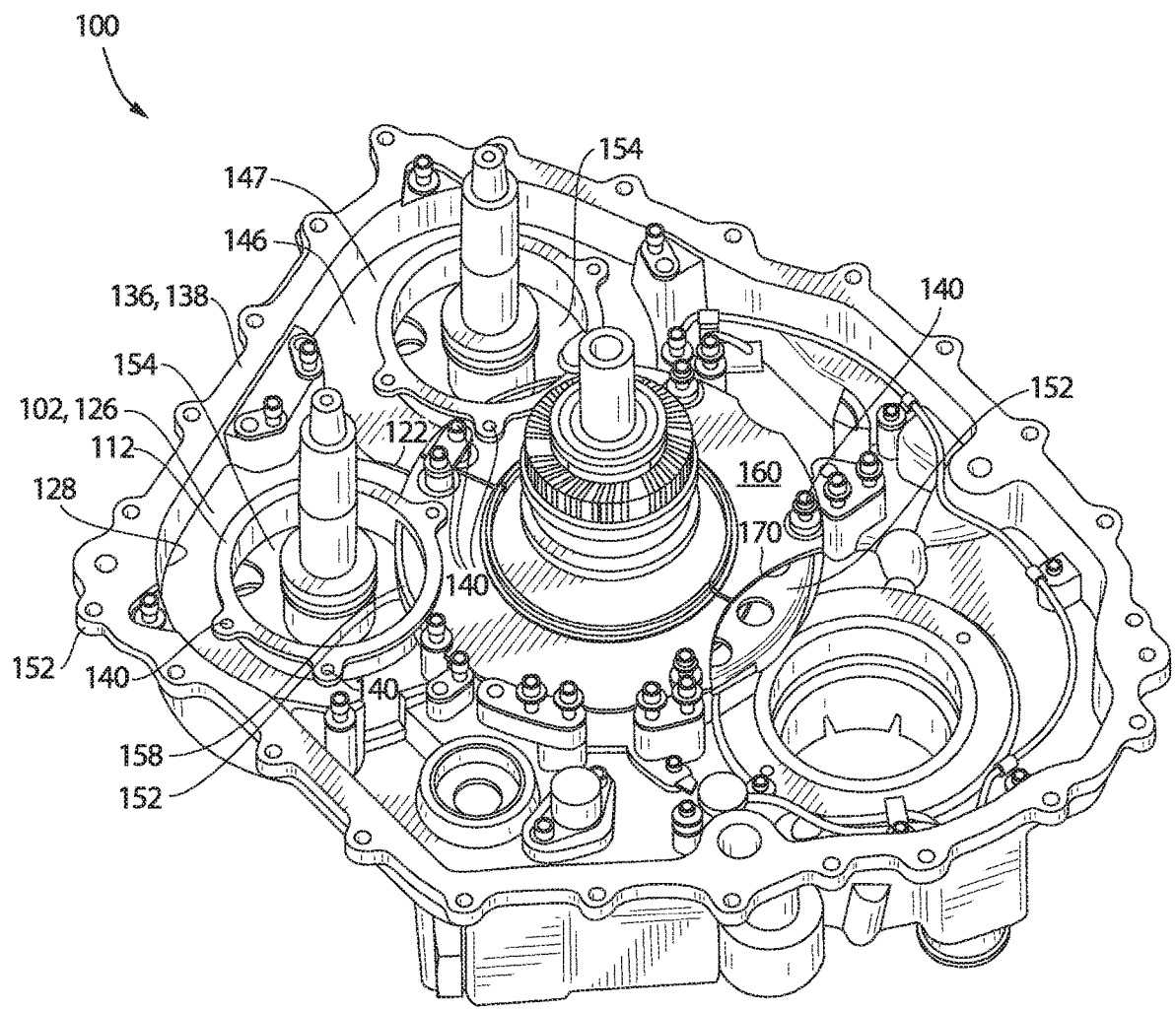
FIG. 4 is a perspective view of the gear shroud of FIG. 1, showing the registration feature engaged with the outer wall of an IDG housing.

With reference now to FIG. 4, wherein the registration feature 128 is engaged to an outer housing wall 138 of the IDG housing 136. The mounting flange 112 defines a plurality of fastener apertures 140 therethrough, identified in FIG. 1. A hydraulic transmission unit 148, shown in FIG. 5, mounted to the mounting flange 112 by fasteners 144 engaged in the fastener apertures 140. An opposed gear shroud 146, identified in FIG. 4, for a second hydraulic transmission 142, shown in FIG. 5, unit that extends parallel to the first hydraulic transmission unit 148, wherein the opposed gear shroud 146 includes a concavity 122 in the plate 147 thereof that engages the plate 102 of the first hydraulic transmission unit 148.

Figure 3:
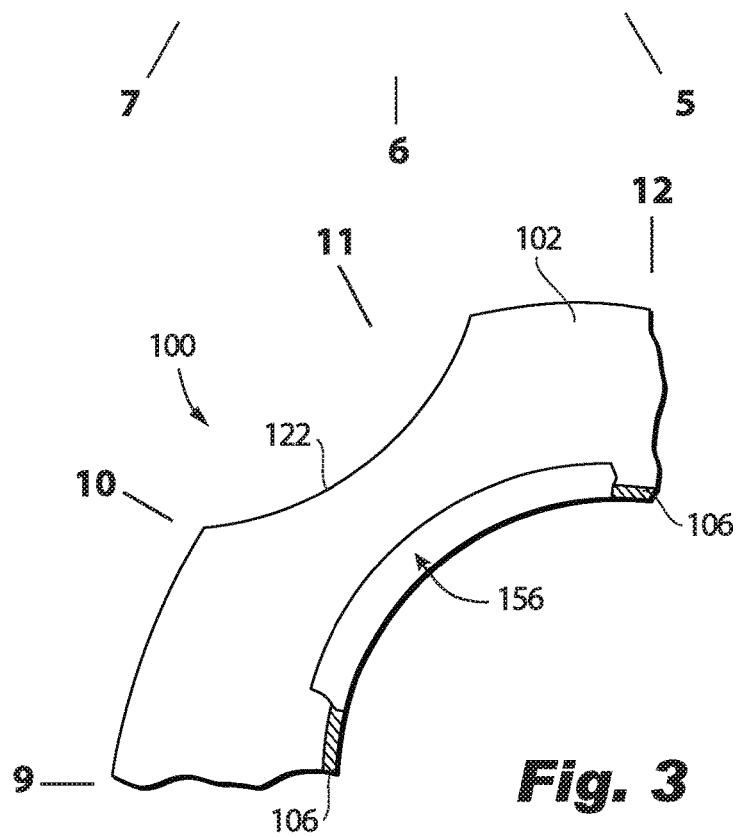
FIG. 3 is a cross-sectional plan view of a portion of the gear shroud of FIG. 2, showing the aperture through the riser tube.
Figure 6:
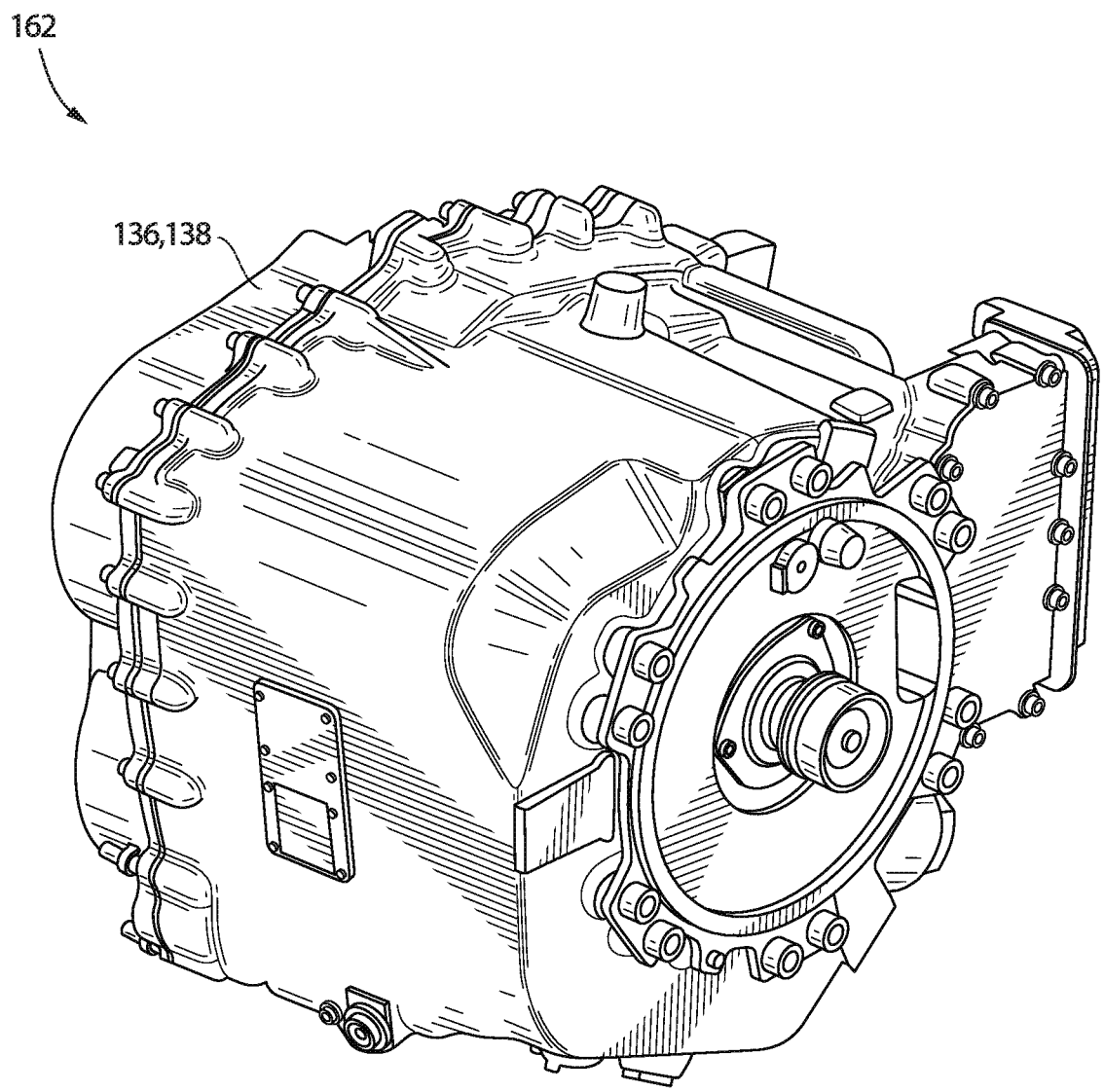
FIG. 6 is a perspective view of the IDG housing of FIG. 5.

The riser tube 106 defines an aperture 156 therethrough, identified in FIG. 1A. As shown in FIG. 3, the aperture 156 extends in a circumferential portion of the riser tube 106 from a position between a 1 o'clock position and the 12 o'clock position, and a position between 10 o'clock and 9 o'clock relative to the 12 o'clock position. As shown in FIG. 4, a portion 158 of a differential shroud 160 extends within the aperture 156. As shown in FIG. 6, when fully assembled, the outer housing wall 138 of the IDG housing 136 surrounds the components shown in FIGS. 4-5 and forms an IDG 162.

The methods and systems of the present disclosure, as described above and shown in the drawings, provide for gear shrouds with superior properties including reducing the amount of oil churning, which improves IDG efficiency and scavenge pump performance, thus improving the IDG oil servicing range. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A gear shroud arrangement comprising:
   a plate defining an aperture therethrough;
   a riser tube having a first end and an opposed second end, wherein the first end of the riser tube is connected to the plate and is aligned with the aperture;
   a mounting flange extends from the second end of the riser tube; and
   a shroud member extending from the plate in a direction opposite the riser tube, wherein the shroud member includes:
      a first shroud segment circumferentially crossing a 0 degrees position, on vertical centerline that passes through the a center axis of the riser tube on the plate as viewed looking toward the mounting flange; and
      a second shroud segment starting circumferentially between the 0 degrees position and a 270 degrees position relative to the 0 degrees position, and extending counter-clockwise to a position circumferentially between the 270 degrees position and a 180 degrees position relative to the 0 degrees position, wherein the second shroud segment is convex relative to the riser tube, wherein the second shroud segment is curved around an axis parallel to the center axis of the riser tube.

2. The arrangement as recited in claim 1, wherein the shroud member includes a shroud segment circumferentially crossing a 0 degrees position on the plate as viewed looking toward the mounting flange.

3. The arrangement as recited in claim 1, wherein the shroud member includes a shroud segment starting circumferentially between a 0 degrees position and a 270 degrees position on the plate as viewed looking toward the mounting flange, and extending counter-clockwise.

4. The arrangement as recited in claim 3, wherein the shroud member extends counterclockwise to a position circumferentially between the 270 degrees position and a 180 degrees position on the plate as viewed looking toward the mounting flange.

5. The arrangement as recited in claim 1, wherein the riser tube defines an aperture therethrough extending in a circumferential portion of the riser tube from a position between:
   a 30 degrees position and the 0 degrees position; and
   a position between 300 degrees and 270 degrees relative to the 0 degrees position.

6. The arrangement as recited in claim 1, wherein the plate defines a concavity between the 0 degrees position and the 270 degrees position for accommodating a differential gear meshing with hydraulics transmission gear shrouded by the shroud member.

7. The arrangement as recited in claim 1, wherein the plate defines a registration feature for registering the plate with an IDG housing, wherein the registration feature includes a radiused section extending from a 180 degrees position through a 90 degrees position, and past a k30 degrees position relative to the 0 degrees position.

8. The arrangement as recited in claim 7, wherein the registration feature includes a flat land extending tangent to the radiused section from the 180 degrees position, terminating in an end that is perpendicular to the flat land.

9. The arrangement as recited in claim 8, further comprising an IDG housing, wherein the registration feature is engaged to an outer housing wall of the IDG housing.

10. A gear shroud arrangement comprising:
    a plate defining an aperture therethrough;
    a riser tube having a first end and an opposed second end, wherein the first end of the riser tube is connected to the plate and is aligned with the aperture;
    a mounting flange extends from the second end of the riser tube; wherein the mounting flange defines a plurality of fastener apertures therethrough, and further comprising a hydraulic transmission unit mounted to the mounting flange by fasteners engaged in the fastener apertures;

a shroud member extending from the plate in a direction opposite the riser tube, wherein the shroud member includes:
- a first shroud segment circumferentially crossing a 0 degrees position, on vertical centerline that passes through the a center axis of the riser tube on the plate as viewed looking toward the mounting flange; and
- a second shroud segment starting circumferentially between the 0 degrees position and a 270 degrees position relative to the 0 degrees position, and extending counter-clockwise to a position circumferentially between the 270 degrees position and a 180 degrees position relative to the 0 degrees position, wherein the second shroud segment is convex relative to the riser tube, wherein the plate defines a registration feature for registering the plate with an IDG housing, wherein the registration feature includes a radiused section extending from a 180 degrees position through a 90 degrees position, and past a 30 degrees position relative to the 0 degrees position, wherein the registration feature includes a flat land extending tangent to the radiused section from the 180 degrees position, terminating in an end that is perpendicular to the flat land, and
- an IDG housing, wherein the registration feature is engaged to an outer housing wall of the IDG housing.

11. The arrangement as recited in claim 10, wherein the hydraulic transmission unit is a first hydraulic transmission unit and further comprising an opposed gear shroud for a second hydraulic transmission unit extending parallel to the first hydraulic transmission unit, wherein the opposed gear shroud includes a concavity in the plate thereof that engages the plate of the first hydraulic transmission unit.

12. The arrangement as recited in claim 11, wherein the riser tube defines an aperture therethrough extending in a circumferential portion of the riser tube from a position between:
- a 30 degrees position and the 0 degrees position; and
- a position between 300 degrees and 270 degrees relative to the 0 degrees position, and wherein a differential shroud extends within the aperture.

* * * * *